US008491020B2

(12) United States Patent
Lopes

(10) Patent No.: US 8,491,020 B2
(45) Date of Patent: Jul. 23, 2013

(54) TONGUE LATCH WITH PROTECTION

(75) Inventor: Antonio Jorge Freire Lopes, Sao Paulo (BR)

(73) Assignee: Unikey Componentes Industrials Ltda. (BR)

( * ) Notice: Subject to any disclaimer, the term of this patent is extended or adjusted under 35 U.S.C. 154(b) by 847 days.

(21) Appl. No.: 12/141,964

(22) Filed: Jun. 19, 2008

(65) Prior Publication Data
US 2009/0315309 A1 Dec. 24, 2009

(51) Int. Cl.
*E05C 3/02* (2006.01)
*E05C 19/00* (2006.01)

(52) U.S. Cl.
USPC ........ 292/194; 292/1; 292/251; 292/DIG. 56; 70/139

(58) Field of Classification Search
USPC .......... 292/1, 57–69, 137, 194, 251, DIG. 56; 70/114, 116, 139, 360, 361
See application file for complete search history.

(56) References Cited

U.S. PATENT DOCUMENTS

| | | | | | |
|---|---|---|---|---|---|
| 1,194,636 | A | * | 8/1916 | Joy | 292/163 |
| 1,290,133 | A | * | 1/1919 | Dusseau | 292/202 |
| 1,471,206 | A | * | 10/1923 | Reynolds | 292/194 |
| 1,597,837 | A | * | 8/1926 | Staley | 292/57 |
| 1,620,414 | A | * | 3/1927 | Vanderlip | 292/101 |
| 1,653,553 | A | * | 12/1927 | Edelmann | 292/175 |
| 1,841,890 | A | * | 1/1932 | Hannon | 292/204 |
| 2,125,655 | A | * | 8/1938 | Schlage | 292/2 |
| 2,203,333 | A | * | 6/1940 | Klumpp | 292/67 |
| 2,255,402 | A | * | 9/1941 | Vile | 70/139 |
| 2,823,941 | A | * | 2/1958 | Ellis | 292/137 |
| 3,335,453 | A | * | 8/1967 | Lovelace | 16/82 |
| 3,402,958 | A | * | 9/1968 | Barry | 292/62 |
| 4,492,394 | A | * | 1/1985 | Dignan | 292/64 |
| 4,583,775 | A | * | 4/1986 | Bisbing | 292/64 |
| 4,639,040 | A | * | 1/1987 | Fujita et al. | 297/378.13 |
| 4,763,935 | A | * | 8/1988 | Bisbing | 292/66 |
| 4,823,571 | A | * | 4/1989 | O'Gara | 70/139 |
| 4,981,313 | A | * | 1/1991 | Makamura | 292/340 |
| 4,995,652 | A | * | 2/1991 | Mugnolo et al. | 292/202 |
| 5,215,342 | A | * | 6/1993 | Yuge et al. | 292/340 |
| 5,234,236 | A | * | 8/1993 | Gromotka | 292/194 |
| 5,249,443 | A | * | 10/1993 | Anderson | 70/370 |
| 5,491,993 | A | * | 2/1996 | Anderson | 70/367 |
| 5,632,517 | A | * | 5/1997 | Paulik et al. | 292/341.12 |
| 5,961,162 | A | * | 10/1999 | Glaser et al. | 292/198 |
| 6,116,660 | A | * | 9/2000 | Langkamp et al. | 292/65 |
| 6,209,369 | B1 | * | 4/2001 | Freck | 70/375 |
| 6,296,286 | B2 | * | 10/2001 | Glaser et al. | 292/198 |
| 6,443,505 | B1 | * | 9/2002 | Linares et al. | 292/195 |
| 6,640,592 | B2 | * | 11/2003 | Vickers | 70/83 |
| 6,820,912 | B1 | * | 11/2004 | Lavoie | 296/65.03 |
| 6,843,082 | B2 | * | 1/2005 | Vickers | 70/83 |
| 7,905,525 | B2 | * | 3/2011 | Badia | 292/262 |

* cited by examiner

*Primary Examiner* — Carlos Lugo
(74) *Attorney, Agent, or Firm* — Schmeiser, Olsen & Watts, LLP

(57) ABSTRACT

A tongue latch with a protection comprising a metal part folded to form a first longitudinal extension and a second longitudinal extension, the longitudinal extension terminates with a circular form having a squared hole, wherein the second extension has a lowered edge with special cuttings to lock the protection is provided. The protection comprises a hollow part made from a plastic material with low coefficient of friction and a mouthpiece with thin walls to better adjust to the dimensions of the tongue.

1 Claim, 3 Drawing Sheets

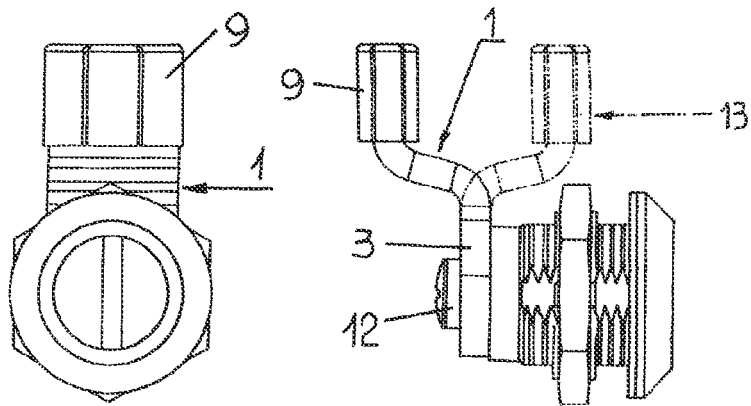
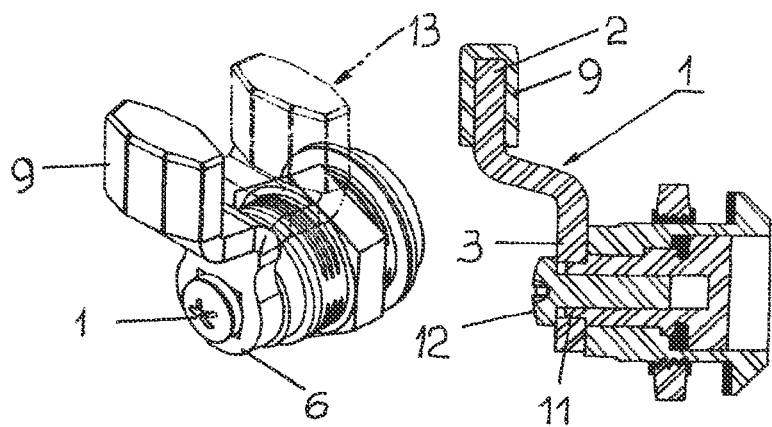

TONGUE LATCH WITH PROTECTION

FIELD OF THE INVENTION

The present invention relates to a tongue latch with protection, provided with great utility, functionality and efficiency, constituting important functional, technical, and economic improvements, that overcomes all inconveniences and deficiencies existing in conventional tongue latches, providing a series of advantages inherent to its applicability, in order to completely satisfy the considered objectives, fulfilling in a practical and efficient way the designated functions, providing proper and innovative characteristics, and meeting the fundamental requirement of novelty.

BACKGROUND OF THE INVENTION

It is known through the state of art that there are metal sheet tongues provided with the necessary resistance to fulfill its functions. However, metal sheet tongues present a serious problem, since they are made from metal sheets and cannot prevent friction with other component elements of said latches, removing the painting and consequently subjecting said tongues to rust and corrosion attacks, thus causing bad functioning and damages.

It is also known through the state of art that there are plastic tongues designed to eliminate the problems caused by metal sheet tongues, especially to prevent friction. However, the material used to construct said plastic tongues does not provide the mechanical resistance necessary to weighed applications, and thus they would be subject to break and cause more inconvenient, being suitable only for light applications.

SUMMARY OF THE INVENTION

Accordingly, it is an object of this invention to provide a versatile metal tongue provided with a locking system and a special bending that allows said metal tongue invert its positioning in the latch, providing said latch with a double effect use.

It is a further object of the present invention to provide a protection made from a plastic material with low coefficient of friction, wherein said protection is fitted to the tip of said tongue, within its dimensions, where it is firmly locked. Said protection has a special sliding peripheral form that prevents friction between other elements of said latch, ensuring better functioning, smoothness of movement and greater durability, in addition to be free of corrosion risk.

In order to have a clear visualization of said tongue latch with protection in question, illustrative drawings are attached, and references are made to them, in order to better elucidate the detailed description bellow.

BRIEF DESCRIPTION OF THE DRAWINGS

FIGS. 9 and 10 show a posterior view and a side view of the tongue with said connected protection, wherein said connected protection is mounted on a latch mechanism. In FIG. 10, broken lines show the inversion of position of said tongue.

FIG. 11 shows a perspective view of the latch mechanism, wherein said protection is connected to said tongue. Broken lines show said tongue in the inverse position.

FIG. 12 shows a side view of the set, in longitudinal section.

DETAILED DESCRIPTION OF THE INVENTION

Figure 1:
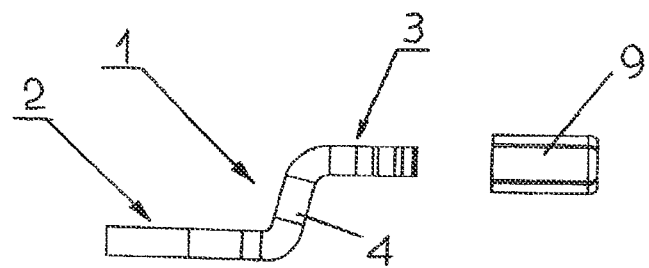
FIGS. 1 and 2 show a side view and a top view of the tongue and its protection, wherein said protection is separated from said tongue.
Figure 2:
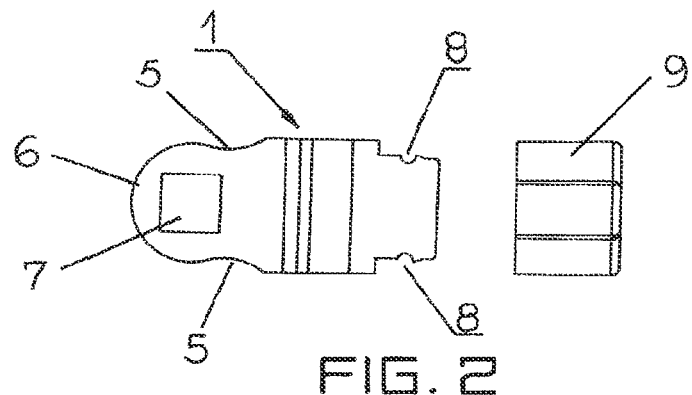
Figure 3:
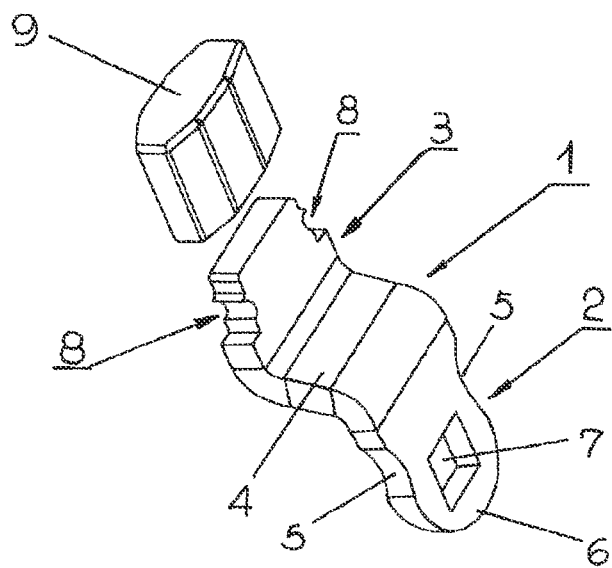
FIG. 3 shows a perspective view of the tongue and its protection, wherein said protection is separated from said tongue.
Figure 4:
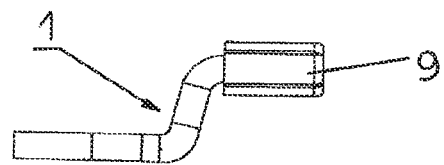
FIGS. 4 and 5 show a side view and a top view of the tongue and its protection, wherein said protection is connected to said tongue.
Figure 5:
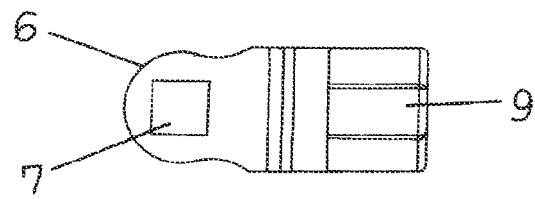
Figure 6:
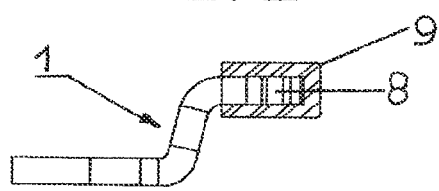
FIGS. 6 and 7 show a side view and a top view of the tongue and its protection, wherein said protection is connected to said tongue and a section view.

In accordance with these illustrations and the details thereof, the present invention, Tongue Latch with Protection, herein disclosed is characterized essentially by comprising a metal part (1) conveniently folded into the form of "S", defining two longitudinal extensions in opposite directions and in two plans (2) and (3), wherein said longitudinal extensions are connected by an slightly inclined intermediate extension (4). After a concave taper at the sides (5), said longitudinal extension (2) terminates with a circular form (6), where is provided a squared hole (7). The terminal of said opposite extension (3) has lowered edges with special cuttings (8), defining a locking system to lock said protection.

Figure 7:
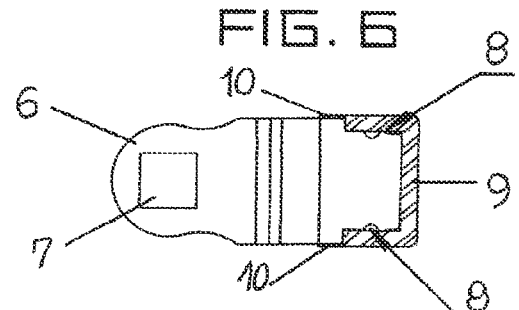
Figure 8:
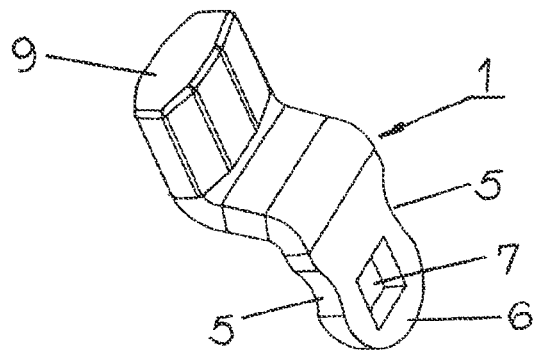
FIG. 8 shows a perspective view of the tongue and its protection, wherein said protection is connected to said tongue.

Said protection (9) comprises a hollow part made from a plastic material with low coefficient of friction, in the form of prism, with eight side faces formed as parallelograms and with rounded edges, having a mouthpiece with thin walls (10) to better adjust to the dimensions of said tongue, as can be observed in FIG. 7.

Said protection (9) is connected to the terminal of the extension (3) of said tongue, where it is fitted by mechanical interference and firmly locked by the edges with special cuts (8) of said terminal.

For illustration purposes, FIGS. 9, 10, 11 and 12 show said tongue with the protection connected and mounted on a latch mechanism, wherein through the squared hole (7), said tongue (1) is connected to the squared prolongation (11) of the latch driving core and fixed by a trilobular screw (12) that is screwed into a threaded axial hole of said driving core.

Due to the special bending of said tongue, its positioning in the latch mechanism assembly can be inverted, as illustrated in FIGS. 10 and 11 by broken lines (13), providing to said latch with a double effect use.

The invention claimed is:
1. A tongue latch with a protection comprising:
   a metal part folded into a form of "S", defining a first longitudinal extension and a second longitudinal extension in opposite directions and in a first plane and a second plane, wherein said first longitudinal extension is connected to the second longitudinal extension by a slightly inclined intermediate extension defining a distance between the first plane and the second plane, the first longitudinal extension and the second longitudinal extension each having at least two sides perpendicular to the first plane and the second plane;
   wherein, after a concave taper at each of the at least two sides of the second longitudinal extension, said second longitudinal extension terminates with a circular form having a squared hole;
   wherein a terminal end of said first longitudinal extension has a lowered edge with special cuttings on the at least two sides of the first longitudinal extension, defining a locking system to lock the protection to the terminal end of the first longitudinal extension, the special cutting comprising a curved notch in each of the at least two sides of the first longitudinal extension and a protrusion on each of the at least two sides of the first longitudinal extension, the protrusion having a first side formed by a portion of the curved notch, and a second side having a tapered section, a tip formed on the protrusion where the first side and the second side connect, further wherein the protrusion extends outwardly from the at least two sides so that the tip mechanically interferes with an inner surface of the protection when the protection is locked to the terminal end;

wherein said protection comprises a hollow part made from a plastic material with a low coefficient of friction, in the form of a prism with eight side faces each formed as a parallelogram and with a rounded edge, having a mouthpiece with a thin wall to adjust to the dimensions of the tongue latch;

wherein said protection is connected to the terminal end of the first longitudinal extension of said tongue latch, where the protection is fitted by mechanical interference and firmly locked by the lowered edge with special cuttings of said terminal end of the first longitudinal extension;

wherein the protection surrounds the first longitudinal extension at the terminal end when locked to the terminal end by the lowered edge with special cuttings of the terminal end.

* * * * *